United States Patent
Navaux

Patent Number: 5,088,538
Date of Patent: Feb. 18, 1992

[54] RADIAL PLY TIRE WITH SHOULDER REINFORCEMENT BETWEEN BELT AND CARCASS

[75] Inventor: Stanley Navaux, Bastogne, Belgium

[73] Assignee: The Goodyear Tire & Rubber Company, Akron, Ohio

[21] Appl. No.: 604,268

[22] Filed: Oct. 29, 1990

[51] Int. Cl.⁵ .............. B60C 9/26; B60C 9/18; B60C 9/00

[52] U.S. Cl. .................. 152/528; 152/526; 152/527; 152/538; 152/555

[58] Field of Search .......... 152/555, 538, 524–526, 152/528, 532, 527, 531, 533

[56] References Cited

U.S. PATENT DOCUMENTS

| | | | |
|---|---|---|---|
| 3,233,649 | 2/1966 | Jolivet et al. | 152/538 X |
| 3,386,487 | 6/1968 | Massoubre | 152/555 |
| 3,934,634 | 1/1976 | Verdier | 152/555 |
| 4,047,551 | 9/1977 | Mezzanotte | 152/555 |
| 4,129,162 | 12/1978 | Dewitt | 152/555 |
| 4,166,491 | 9/1979 | Mezzanotte | 152/555 |
| 4,287,929 | 9/1981 | Huinink | 152/555 |
| 4,402,356 | 9/1983 | Musy | 152/531 X |
| 4,790,364 | 12/1988 | Lobb et al. | 152/454 |
| 4,800,941 | 1/1989 | Kabe et al. | 152/538 X |
| 4,807,681 | 2/1989 | Kadota | 152/531 |
| 4,832,101 | 5/1989 | Welter | 152/527 |
| 4,850,412 | 7/1989 | Gupta | 152/556 |
| 4,890,659 | 1/1990 | Harakon et al. | 152/531 |
| 4,947,915 | 8/1990 | Panikkar et al. | 152/538 X |
| 4,966,214 | 10/1990 | Kadota | 152/528 |

OTHER PUBLICATIONS

*Mechanics of Pneumatic Tires*, ed. Samuel Clark, U.S. Dept. of Transportation, Aug. 1981, p. 131.

Primary Examiner—Michael W. Ball
Assistant Examiner—Adrienne C. Johnstone
Attorney, Agent, or Firm—David L. King

[57] ABSTRACT

A radial ply pneumatic tire (1) has carcass plies (16, 17), folded axially around a pair of axially spaced apart bead cores (2). The crown reinforcement (5) has one belt ply (7) folded around at least two unfolded plies (8, 9) and a shoulder reinforcing structure (11) comprising a least three layers reinforced by textile cords, forming with an axial plane intersecting them, angles which are opposed. The layers have substantially the same width. In a preferred embodiment, the lateral extend (G) of the layers under the folded belt ply (7) ranges between B/4 and B/3, wherein B is half the lateral width of the folded ply and the lateral extent (L) into the sidewall, beyond the edge of the folded ply, ranges between G and 2G.

9 Claims, 3 Drawing Sheets

RADIAL PLY TIRE WITH SHOULDER REINFORCEMENT BETWEEN BELT AND CARCASS

The present invention relates to a pneumatic tire, suitable for use on aircrafts, comprising a radial carcass folded axially around a pair of axially spaced beads, a tread disposed radially outwardly of the crown region of the carcass and a crown reinforcement situated between the carcass and the tread. The crown reinforcement comprises one belt ply having its lateral ends folded around at least one unfolded ply. Tires comprising such folded reinforcements in their crown area have been found to be particularly durable when subjected to high speeds.

It is generally recognized in the tire art that tires suitable for use on aircraft must be capable of operating under conditions of very high speeds and large loads as compared to tires used on automobiles, busses, trucks or similar earthbound vehicles. It is understood, however, that tires for such earthbound vehicles may advantageously be made in accordance with the broad aspects of the invention described herein. As used herein and in the claims, a tire is "suitable for use on an aircraft" if the tire is of a size and load range, or ply rating, specified in either the *YEARBOOK OF THE TIRE AND RIM ASSOCIATION*, or the *YEARBOOK OF THE EUROPEAN TYRE AND RIM TECHNICAL ORGANIZATION*, for the year in which the tire is manufactured, or in the current U.S.A. military specification "MIL-T-5041".

It is known in the art that a tire comprising a high elongation carcass has an outstanding durability. On the other hand, the more rigid a tire belt, the better the tread wear performance of the tire. However a tire having both an extremely rigid belt and a high elongation carcass presents a high stress gradient at the interface of the belt and the carcass; mixing such a rigid belt with a high elongation carcass leads consequently to separation problems at the carcass-belt interface. This separation problem can be reduced significantly by having the lateral edges of at least one belt ply extend slightly into the sidewalls, following thereby the curvature of the carcass ply, so as to limit the flexing of the sidewalls near the crown portion of the tire. A belt ply having its lateral ends folded around at least one ply is however too rigid to undergo any major bending in the shoulder area during the shaping and vulcanizing process of the tire.

The present invention provides a radial tire particularly suitable for use on aircrafts. The tire has a high elongation carcass and a rigid crown reinforcement. The tire comprises at least one carcass ply folded at least in part axially around a pair of axially spaced apart bead cores. Each carcass ply comprises a plurality of parallel reinforcing elements which are oriented at 75° to 90° with respect to the equatorial plane (EP) of the tire. The tire further comprises a crown reinforcement with one belt ply folded around at least two unfolded plies and a shoulder reinforcing structure, comprising at least a first layer adjacent to the radially outermost carcass ply, a second layer adjacent to the first layer, and a third layer adjacent to the second layer. The first layer is reinforced by cords forming with an axial plane intersecting them, an angle ranging between 20° and 50°. The second layer is reinforced by cords forming with an axial plane intersecting them, an angle ranging between −20° and −50°. The third layer is reinforced by cords forming an angle with an axial plane intersecting them, an angle ranging between 45° and 75°. Each layer extends laterally under the folded belt ply and into the sidewall of the tire.

Apart from the excellent durability and treadwear performance of the tire, a further advantage of the invention is to obtain a tire having an increased stiffness in the vicinity of the shoulder area without reducing the flexibility of the remaining portion of the sidewalls.

To acquaint persons skilled in the art with the principles of the invention, certain presently preferred embodiments, illustrative of the best mode now contemplated for the practice of the invention, are described herein making reference to the attached drawings and in which drawings.

Figure 1:
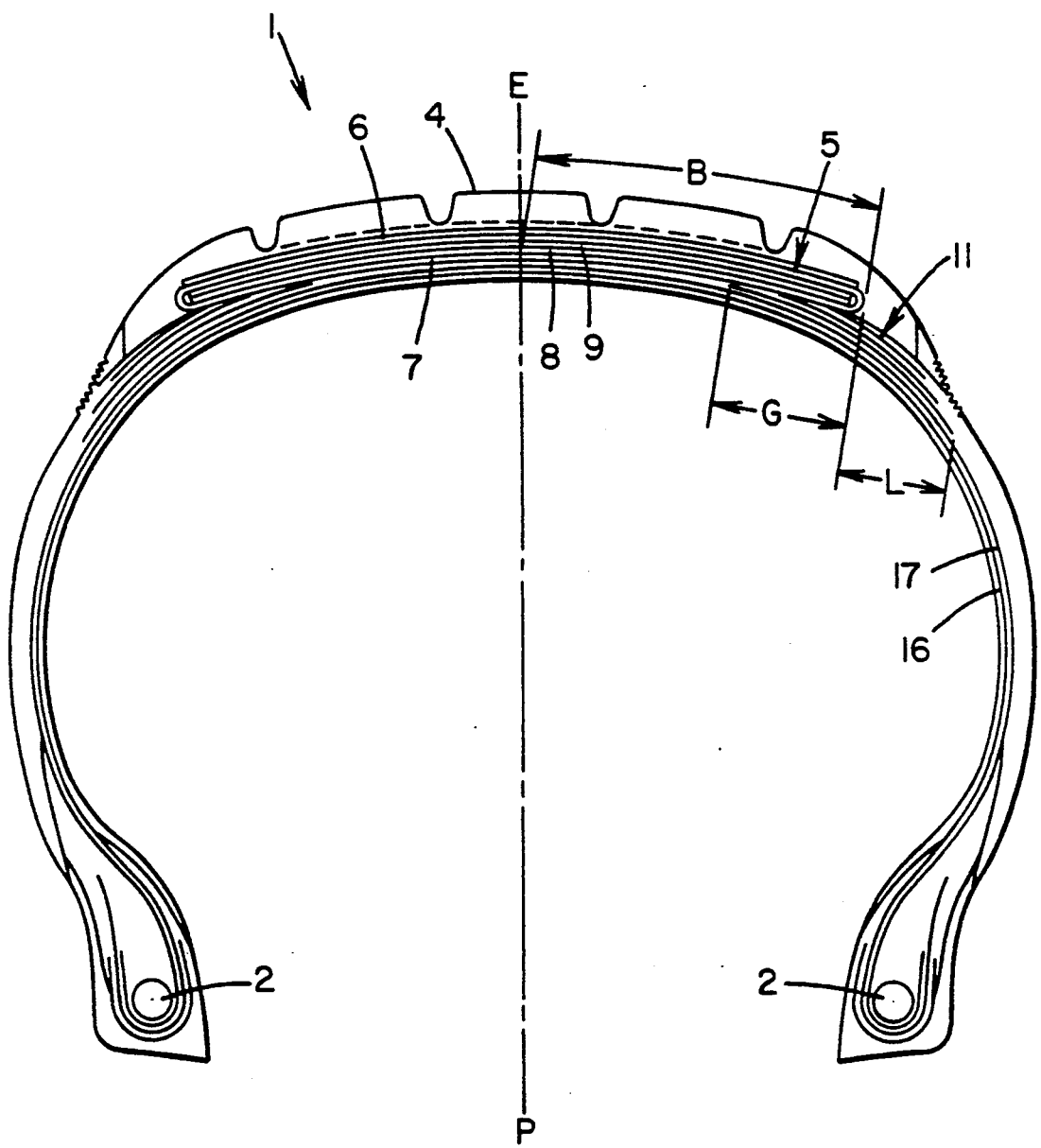
FIG. 1 is a cross-sectional view of a tire according to the invention taken in an axial plane.

With reference to FIG. 1 an aircraft tire 1 is represented, having a ground engaging tread 4, an overlay ply 6, a crown reinforcement 5 comprising plies 7-9, a shoulder reinforcement 11 as well as a pair of substantially inextensible annular bead cores 2, which are axially spaced apart with carcass plies 16, 17 extending between the bead cores.

As used herein and in the claims, the terms "axial" and "axially" refer to directions which are parallel to the axis of rotation of a tire, and the terms "radial" and "radially" refer to directions that are radially toward or away from to the axis of rotation of a tire. The terms "lateral" and "laterally" are understood to refer to directions going from one sidewall of a tire towards the other sidewall of a tire. "Cord angle" means the angle, left or right in a plan view of the tire, formed by a cord with respect to the equatorial plane or an axial plane; a minus sign marked before the angle value means that the angles formed by cords belonging to this ply or layer are opposed to those formed by cords of the adjacent ply or layer i.e. if the angles formed by the cords of one ply or layer with the mentioned plane are left (right), the angles formed by the adjacent ply or layer with said plane are right (left).

All tire dimensions and angles mentioned herein and in the claims refer to dimensions and angles measured on a tire having been mounted on its specified rim and inflated to its specified inflation pressure while not being subject to any load.

Each of the carcass plies 16, 17 comprises a plurality of reinforcing elements oriented at 75° to 90°, preferably 80° to 89°, with respect to the equatorial plane (EP) of the tire. The "equatorial plane" of a tire is a plane that is perpendicular to the axis of rotation of the tire and passes through the center of the tire tread; "an axial plane" is a plane passing through the axis of rotation of the tire.

The reinforcing elements of all of the carcass plies 16, 17 can be substantially the same and made of any suitable material, for example steel, rayon, polyester, polyamide or aromatic polyamide.

Figure 2:
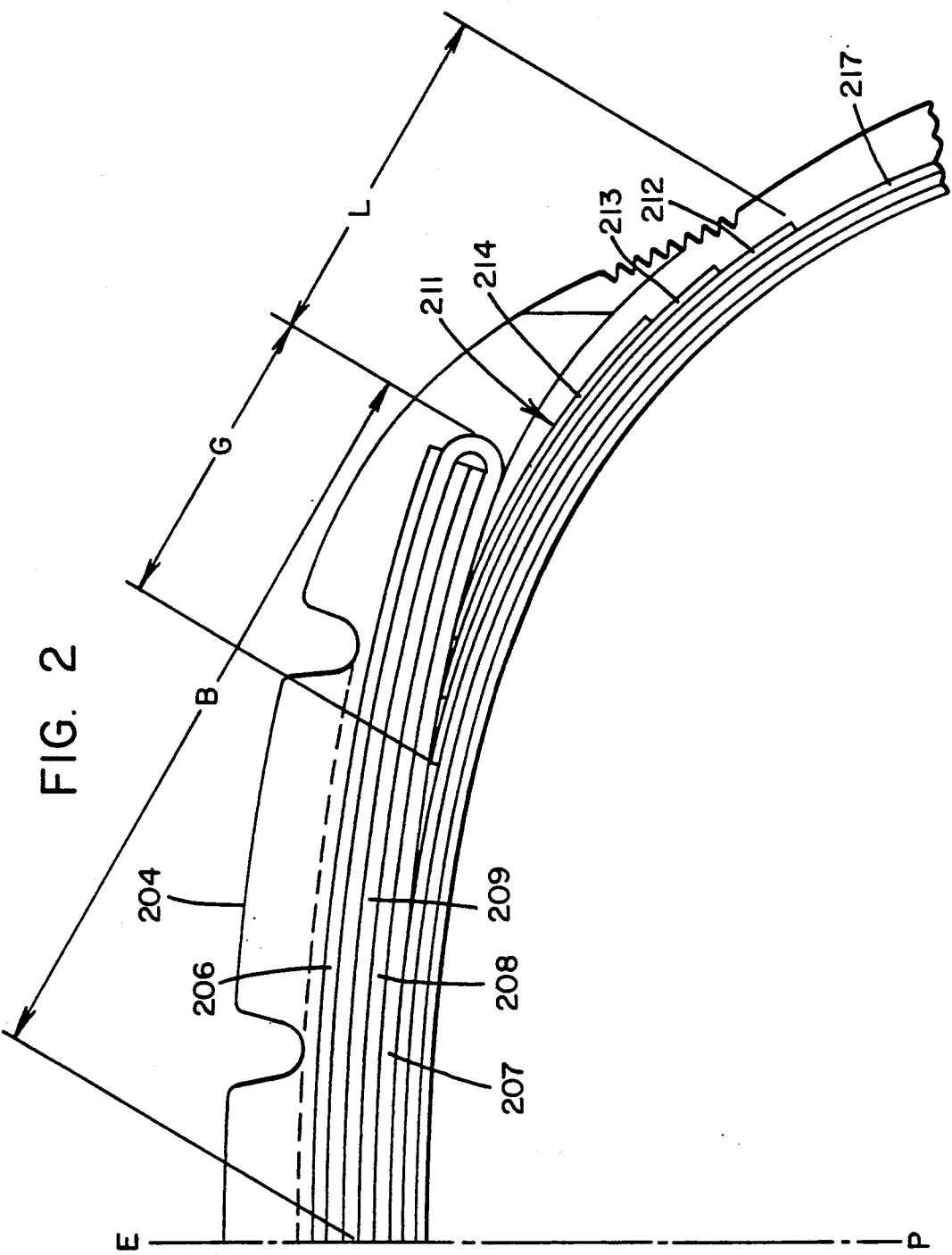
FIG. 2 is an enlarged cross-sectional view of a part of the crown region of a tire according to FIG. 1.

As can best be distinguished on FIG. 2, wherein structural details identical to those shown on FIG. 1 bear the same reference number increased by 200, the crown reinforcement comprises one belt ply 207 folded around two plies 208, 209. The folded ply 207 is reinforced with aramid cords having a linear density of 1,500/3 denier and having a fabric density of about 14 EPI (ends per inch) and forming with the equatorial plane of the tire an angle comprised between 18° and 26°. The plies 208, 209 are also reinforced with aramid cords having a linear density of 1,500/3 denier and a fabric density of about 18 EPI. The angles formed by the reinforcement cords of the two unfolded plies with the equatorial plane of the tire are opposed and range between 12° and 24° and preferably between 16° and 20° for one of the plies and between −12° and −24° and preferably between −16° and −20° for the other ply. The angles formed by the reinforcement cords of the radially innermost unfolded ply 208 and of the folded ply 207 with the equatorial plane are opposed.

Between the ground engaging tread portion 204 and the belt structure is disposed at least one overlay ply 206 reinforced by 840/2 denier nylon cords. The nylon cords have a fabric density of about 22 EPI and are parallel to each other in each ply. It is believed that overlay plies only make a minor contribution to the properties of the tire of the present invention. Their main function is to protect the belt during retreading operations, where they act as a visual warning layer when the elastomeric material constituting the tire tread is buffed away.

Between the lateral ends of the belt and the radially outermost carcass ply 217 a shoulder reinforcing structure 211 can be seen. This structure consists of three layers 212-214 reinforced with textile cords.

The first layer 212 adjacent to the radially outermost carcass ply 217 is reinforced by cords forming with an axial plane intersecting them, an angle ranging between 20° and 50° and preferably between 30° and 40°, an angle of 35° being most preferred. The layer extends laterally under the crown reinforcement. A lateral extension G comprised between B/4 and B/3, where B is half the lateral width of the folded ply 207, is preferred. Extensions G superior to B/3 do not appear to lead to any further durability improvements. The layer should not extend too far into the sidewall so that the flexibility of the sidewalls of the tire is maintained; a lateral extension L beyond the edge of the folded ply, comprised between G and 2G is preferred.

The second layer 213 adjacent to the first layer 212 is reinforced by cords forming with an axial plane intersecting them, an angle ranging between −20° and −50° and preferably between −30° and −40°, an angle of −35° being most preferred. The second layer has a slightly smaller width than the first layer so that both lateral ends of the layers are spaced by about 5 mm the lateral ends of the second layer being located inside the width of the first layer.

The third layer 214 adjacent to the second layer 213 is reinforced by cords forming with an axial plane intersecting them, an angle ranging between 45° and 75° and preferably between 55° and 65, an angle of 60° being most preferred. The third layer 214 has a slightly smaller width than the second layer 213 so that the lateral ends of the layers are spaced by about 5 mm the lateral ends of the third layer being located inside the width of the second layer.

It is to be understood that the lateral dimensions of the layers 212-214 should be substantially equal in order to achieve the required durability improvement. The relative lateral dimensions should in any case not differ by more than 20%. The reduction in width when passing from a radially inner layer to an adjacent radially outer layer is chosen in the described embodiment in order to avoid a major step-off, due to the superposed edges of the three (or more) layers, in the shoulder area of the tire.

Figure 3:
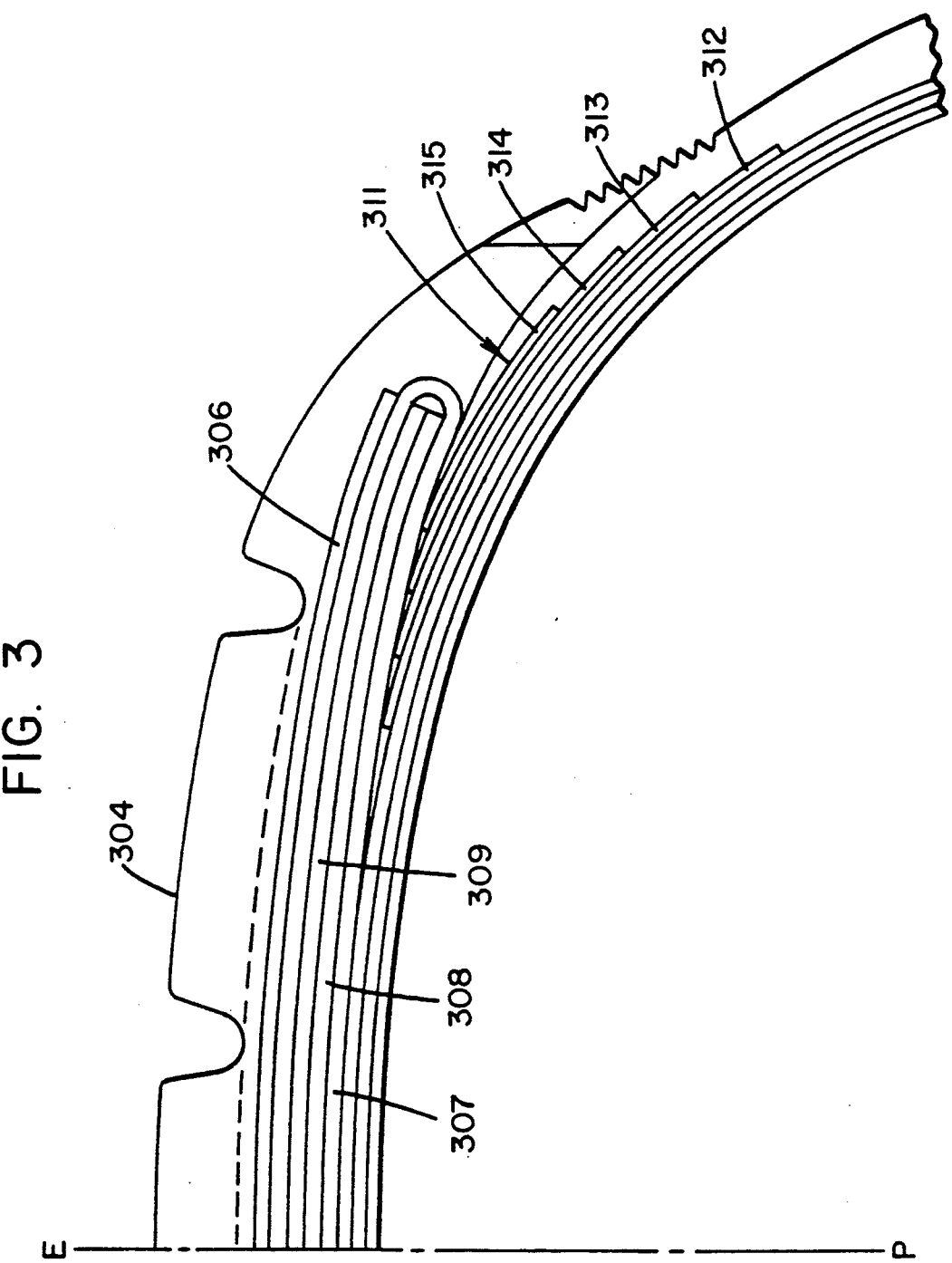
FIG. 3 is an enlarged cross-sectional view of a part of the crown region of a tire according to another embodiment of the invention.

FIG. 3 shows another embodiment of a belt according to the invention. Structural details comparable to those shown on FIG. 1 bear the same reference number increased by 300. The shoulder reinforcing structure 311 comprises apart from the three layers 312, 313, 314, corresponding to the three layers 212-214 shown on FIG. 2, a fourth layer 315, disposed radially outwardly of the third layer 314. The fourth layer 315 is reinforced by cords forming with an axial plane intersecting them, an angle comprised between −45° and −75° and preferably between −55° and −65°, an angle of −60° being most preferred. While the fourth layer makes a contribution to the strength of the shoulder reinforcing structure 311, its main function is to protect the structure during retreading operations.

In a preferred embodiment of the invention, the angles formed by an axial plane and the reinforcement cords of the radially outermost layer, bearing reference 214 in the embodiment according to FIG. 2 and reference 315 in the embodiment according to FIG. 3, are opposed to the angles formed by an axial plane and the reinforcement cords of the folded ply 207 respectively 307. In the embodiment described with reference to FIG. 2, the folded ply 207 should consequently form an angle comprised between −64° and −72° with an axial plane intersecting them, the reinforcement cords of layer 214 forming with the axial plane an angle comprised between 45° and 75°.

The textile cords reinforcing the different layers can be made from polyamide, polyester, rayon, aramid, etc. In order to limit the gauge of the reinforcing structure a preferred embodiment of the invention consists in reinforcing the layers with nylon monofilaments. A monofilament is by definition a cord consisting of one filament. It is preferred that the monofilaments have an oval section or are flattened with rounded-off edges. Preferably the nylon monofilaments should have their greatest linear cross-sectional extent, i.e. their width, two to five times the linear cross-sectional extent perpendicular to said width, i.e. their thickness. Such filaments offer, for a given required strength, a gauge advantage and have a lower rivet area for a given fabric density than cords or filaments with conventional circular cross-section.

The reinforcement cords of the layers can be substantially the same and have a minimum linear density of 2000 denier and a minimum fabric density of 12 EPI. Layers reinforced by nylon cords having densities of 840/2 denier and 22 EPI or by nylon monofilaments having densities of 4000 denier and 16 EPI are considered as providing shoulder reinforcements having the required properties.

While certain representative embodiments have been described for the purpose of illustrating the invention, it will be apparent to those skilled in the art that various changes and modifications may be made therein without departing from the spirit or scope of the invention.

I claim:

1. A radial pneumatic tire comprising at least one carcass ply folded at least in part axially around a pair of axially spaced apart bead cores, each carcass ply comprising a plurality of parallel reinforcing elements which are oriented at 75 to 90 degrees with respect to an equatorial plane (EP) of the tire and a crown reinforcement with one belt ply folded around at least two unfolded belt plies and a shoulder reinforcing structure comprising at least:

a first layer adjacent to the radially outermost carcass ply being reinforced by cords forming with an axial plane intersecting them, an angle ranging between 20 and 50 degrees; a second layer adjacent to said first layer reinforced by cords forming with an axial plane intersecting them, an angle ranging between $-20$ and $-50$ degrees; a third layer adjacent to said second layer reinforced by cords forming with an axial plane intersecting them, an angle ranging between 45 and 75 degrees;

the layers extending each laterally under the folded belt ply and into the sidewall of the tire and wherein each radially outer layer of the shoulder reinforcement has both a smaller width than its adjacent radially inner layer and lateral ends located inside the width of its adjacent radially inner layer;

each layer having an extension G into the crown reinforcement of no greater than B/3, where B is half the lateral width of the folded belt ply.

2. A pneumatic tire as described in claim 1, wherein at least one layer has a lateral extent G under the folded ply between B/4 and B/3, where B is half the lateral width of the folded ply.

3. A pneumatic tire as described in claim 2, wherein the lateral extend of at least one layer into the sidewall, beyond the edge of the folded ply is between G and 2G.

4. A pneumatic tire as described in claim 1, wherein said layers have substantially the same width.

5. A pneumatic tire as described in claim 1, wherein there is a fourth layer adjacent to said third layer, the fourth layer being reinforced by cords forming with an axial plane intersecting them, an angle ranging between $-45°$ and $-75°$.

6. A pneumatic tire as described in claim 1, wherein each layer is reinforced by nylon monofilaments having their greatest linear cross-sectional extent, i.e. their width, two to five times the linear cross-sectional extent perpendicular to said width, i.e. their thickness.

7. A pneumatic tire as described in claim 6, wherein the monofilaments have linear densities of at least 2000 denier and fabric densities of at least 12 EPI.

8. A pneumatic tire as described in claim 1, wherein the folded ply is reinformed with aramid cords having a linear density of about 1,500/3 denier, a fabric density of about 14 EPI and forming with the equatorial plane of the tire an angle comprised between 18° and 26°.

9. A pneumatic tire as described in claim 1, wherein there are two unfolded plies reinforced with cords having a linear density of about 1,500/3 denier, a fabric density of about 14 EPI and forming each with the equatorial plane of the tire angles which respectively range between 18° to 21° and $-18°$ to $-21°$.

* * * * *